US012750602B1

(12) United States Patent
Patel et al.

(10) Patent No.: US 12,750,602 B1
(45) Date of Patent: Sep. 29, 2026

(54) POWER DELIVERY SCHEME TO ENHANCE IMAGE QUALITY

(71) Applicant: Apple Inc., Cupertino, CA (US)

(72) Inventors: Himesh Patel, Fremont, CA (US); Khwaja Haris Jan, Newark, CA (US)

(73) Assignee: Apple Inc., Cupertino, CA (US)

( * ) Notice: Subject to any disclaimer, the term of this patent is extended or adjusted under 35 U.S.C. 154(b) by 285 days.

(21) Appl. No.: 18/475,144

(22) Filed: Sep. 26, 2023

(51) Int. Cl.

| | |
|---|---|
| ***H04N 25/709*** | (2023.01) |
| ***H04N 25/671*** | (2023.01) |
| ***H04N 25/772*** | (2023.01) |
| ***H04N 25/79*** | (2023.01) |

(52) U.S. Cl.
CPC ........... *H04N 25/709* (2023.01); *H04N 25/79* (2023.01); *H04N 25/671* (2023.01); *H04N 25/772* (2023.01)

(58) Field of Classification Search
None
See application file for complete search history.

(56) References Cited

U.S. PATENT DOCUMENTS

| | | | | |
|---|---|---|---|---|
| 8,369,099 | B2 | 2/2013 | Kim et al. | |
| 8,890,047 | B2 | 11/2014 | Solhusvik et al. | |
| 9,332,632 | B2 | 5/2016 | Schneider et al. | |
| 9,813,046 | B2 | 11/2017 | Shekhar et al. | |
| 10,033,303 | B2 | 7/2018 | Liu et al. | |
| 10,062,765 | B2 | 8/2018 | Oh et al. | |
| 11,088,070 | B2 | 8/2021 | Briggs et al. | |
| 11,503,699 | B2 | 11/2022 | Niu et al. | |
| 2003/0058355 | A1* | 3/2003 | Wong | H04N 1/2158 386/E5.067 |
| 2013/0068929 | A1* | 3/2013 | Solhusvik | H10F 39/809 250/208.1 |
| 2015/0301180 | A1* | 10/2015 | Stettner | G01S 7/4863 257/448 |
| 2016/0135282 | A1 | 5/2016 | Hata | |
| 2017/0288647 | A1* | 10/2017 | Shekhar | H01L 25/0652 |
| 2021/0297615 | A1* | 9/2021 | Ogata | H04N 25/76 |
| 2021/0399031 | A1 | 12/2021 | Kobayashi | |
| 2022/0094825 | A1 | 3/2022 | Song et al. | |
| 2022/0246664 | A1 | 8/2022 | Kobayashi | |
| 2023/0071476 | A1 | 3/2023 | Achkir et al. | |
| 2023/0207600 | A1 | 6/2023 | Tanaka | |

FOREIGN PATENT DOCUMENTS

| | | |
|---|---|---|
| CN | 102595775 | 7/2012 |

* cited by examiner

*Primary Examiner* — Sinh Tran
(74) *Attorney, Agent, or Firm* — Robert C. Kowert; Kowert, Hood, Munyon, Rankin & Goetzel, P.C.

(57) ABSTRACT

A power delivery scheme for an image sensor on a camera is described. The image sensor may include multiple connections to pixels on a perimeter of the image sensor outside the light detection area of the image sensor. Power and ground to the image sensor may be provided through a common plane positioned near the image sensor. The power delivery scheme may include routing power and ground from the common plane individually to the multiple connections on the image sensor. In some instances, the individual routings from the common plane pass through a local routing plane of the image sensor. Utilization of individual routings to the common plane allows impedance matching and impedance balance between the various connections to the image sensor.

16 Claims, 11 Drawing Sheets

400

POWER DELIVERY SCHEME TO ENHANCE IMAGE QUALITY

BACKGROUND

Technical Field

Embodiments described herein are related to power delivery for an image sensor on a camera and, more particularly, to circuits for delivering power to pixels and other circuits on the image sensor.

Description of the Related Art

The advent of small, mobile multipurpose devices such as smartphones and tablet or pad devices has resulted in a need for high-resolution, small form factor cameras for integration in the devices. Cameras may incorporate image sensors in a variety of configurations. Some configurations may require power be delivered to the image sensor at various locations on the image sensor. For instance, power may be delivered at multiple locations on a perimeter of an image sensor. Image quality may be affected by the distribution of power delivery across an image sensor.

BRIEF DESCRIPTION OF THE DRAWINGS

The following detailed description refers to the accompanying drawings, which are now briefly described.

Figure 1:
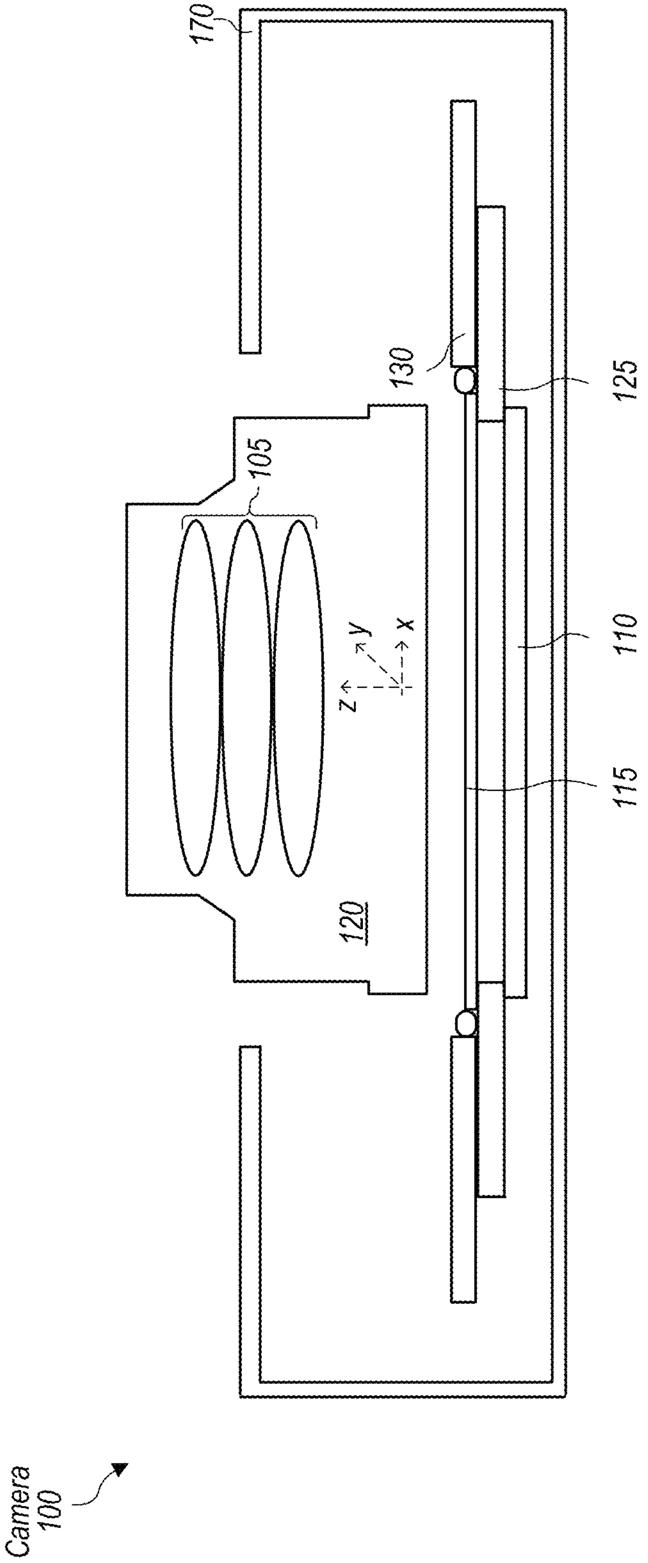
FIG. 1 illustrates a cross-sectional view representation of a camera, in accordance with some embodiments.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description.

DETAILED DESCRIPTION OF EMBODIMENTS

Various embodiments described herein relate to power delivery techniques for image sensors in a camera. An image sensor typically include power and ground connections to pixels within the image sensor along with power and ground connections for other circuits on the image sensor. Examples of other circuits include analog-to-digital converter (ADC) circuits, noise sensing circuits, and charge pump voltage regulator circuits. Because of the design of image sensors and other components attached to the image sensors (e.g., signal routing or power supply components), there may be variations in the way power is delivered to the pixels and other circuits on the image sensor. For instance, the image sensor may have multiple connections for pixels and other circuits at different locations around a perimeter of the image sensor.

Any non-uniformity between routings to the connections on the image sensor (e.g., variations in impedance of the routings) may cause variations in image quality across an image captured by the image sensor. For instance, non-uniformity in the connections may cause noise that creates different artifacts to appear in different areas (e.g., different quadrants) of an image captured by the image sensor. Examples of variations include vertical shading and horizontal shading. Shading is a decrease in image brightness across an image that influences image quality. Shading may, for example, cause unwanted dark or shaded edges to appear in the image or an overall gradient across the entire image.

In some instances, an image sensor may have an internal tuning circuit (e.g., a noise sensing circuit) that attempts to cancel out any noise generated by the camera system, including noise induced at the sensor. The tuning circuit may, however, not be capable of cancelling noise from the power distribution variations to a satisfactory level if there is high transmission noise on the tuning circuit. Accordingly, the present disclosure contemplates various techniques for delivering power to an image sensor that attempt to minimize power distribution variations across the image sensor. For instance, the contemplated embodiments include techniques for matching impedance between routings to multiple connections for pixels and other circuits on the image sensor. Matching the impedance between different routings may reduce noise generated by the image sensor, thereby improving image quality for images captured by the image sensor, for instance, by reducing horizontal and vertical shading. Additionally, the contemplated embodiments include techniques for isolating connections to different circuits on the image sensor to decrease noise induced by transmission between the different circuits on the image sensor, including the tuning (noise sensing) circuit.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

FIG. 1 illustrates a cross-sectional view representation of a camera, in accordance with some embodiments. For purposes of illustration, only relevant components are included in the figures. Furthermore, a coordinate system defined by X-Y-Z axes is also shown in the figures, and an optical axis of lenses 105 is defined as the Z-axis. In some embodiments, the optical axis may correspond to the transmission path of a principal light ray passing through lenses 105 to image sensor 110. In some embodiments, the transmission path of the principal light ray within camera 100 may not necessary be a straight but rather a folded line, e.g., when camera 100 includes a light folding element as part of the one or more lenses that may change the transmission direction of the principal light ray. In that case, the optical axis may refer to any straight part of the folded line. As indicated in FIG. 1, camera 100 may include one or more lenses 105 and an image sensor 110. Lenses 105 may pass through light on to image sensor 110 that may accordingly generate image signals. The image signals may be processed by a processor to produce an image. In some embodiments, camera 100 may include infrared filter (IRF) 115 placed between optical lenses 105 and image sensor 110 to block or reduce infrared light from reaching image sensor 110.

In various embodiments, both lenses 105 and image sensor 110 may be movable relative to one another. For instance, lenses 105 may be contained inside lens holder 120, and camera 100 may include a suspension structure that suspends lens holder 120 from a stationary part of camera 100, e.g., housing 170 of camera 100. The suspension structure may allow lenses 105 (and lens holder 120) to move relative to image sensor 110 in a direction parallel to the optical axis of lenses 105 (e.g., approximately along Z-axis) to perform autofocus (AF).

In certain embodiments, image sensor 110 (and infrared filter 115, if utilized) is affixed to a substrate. The substrate may include a single substrate or a combination of substrates. In some embodiments, the substrate may include first substrate 125 and second substrate 130. First substrate 125 and second substrate 130 may be coupled together. In some embodiments, the structure formed by the illustrated substrates may be formed as a single block or as a set of blocks. In some embodiments, image sensor 110 is affixed to an underneath side of first substrate 125 facing away from lenses 105. Infrared filter 115 may be attached to a top side of first substrate 125 facing lenses 105.

Figure 2:
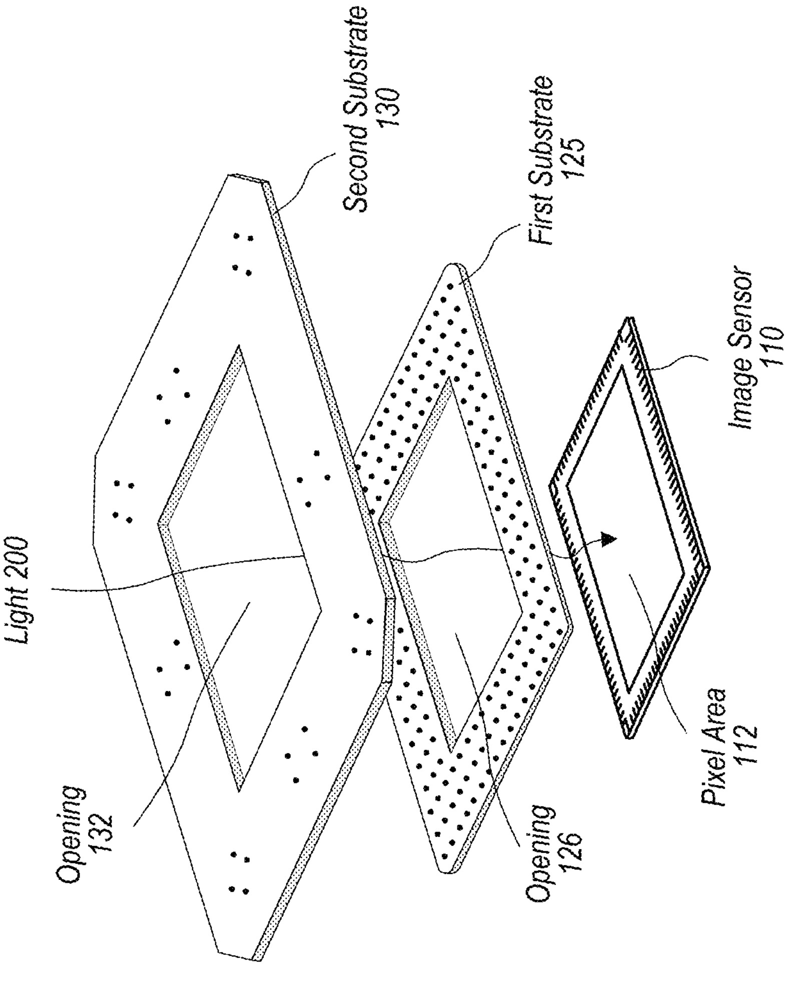
FIG. 2 depicts an exploded view of an image sensor, a first substrate, and a second substrate, according to some embodiments.

In some embodiments, first substrate 125 and second substrate 130 include openings at the position over image sensor 110 to allow light from lenses to pass through infrared filter 115 and reach the image sensor. FIG. 2 depicts an exploded view of image sensor 110, first substrate 125, and second substrate 130, according to some embodiments. In the illustrated embodiment, image sensor includes pixel area 112, first substrate 125 includes opening 126, and second substrate 130 includes opening 132. Openings 126 and 132 allow light 200 (shown by line through openings) to reach pixel area 112, which includes pixels operable to generate electrons in response to incident photoelectrons from light 200.

In various embodiments, second substrate 130 may be used to hold other components and/or route electrical signals from and/or to image sensor 110, as described herein. For instance, in some embodiments, first substrate 125 may be a ceramic substrate and second substrate 130 may be an organic substrate (e.g., a flexible circuit or a printed circuit board (PCB)). Note that, in some embodiments, the substrates may be implemented as one single piece, rather than separate substrates joined together. For example, first substrate 125 and second substrate 130 may be separate substrate layers in a single substrate structure.

Note that camera 100 along with image sensor 110, first substrate 125, and second substrate 130 are presented only as examples for purposes of illustration in FIGS. 1 and 2, and are not intended to limit use implementations of the present disclosure. For instance, in some embodiments, lenses 105 may be fixed and stationary, and only image sensor 110 may be movable in one or more directions, e.g., approximately along (1) Z-axis and/or (2) X- and/or Y-axis. Further, in some embodiments, image sensor 110 may be mounted to substrates (e.g., first substrate 125, second substrate 130, or other substrates) in a different manner than depicted in FIG. 1. For example, while FIG. 1 depicts image sensor 110 mounted in a flip-chip arrangement with first substrate 125 and second substrate 130, additional embodiments may be contemplated where image sensor 110 is mounted in a chip scale package (CSP) or a wire bond package arrangement. Yet further arrangements between image sensor 110 and any number of substrates may also be contemplated.

Figure 3:
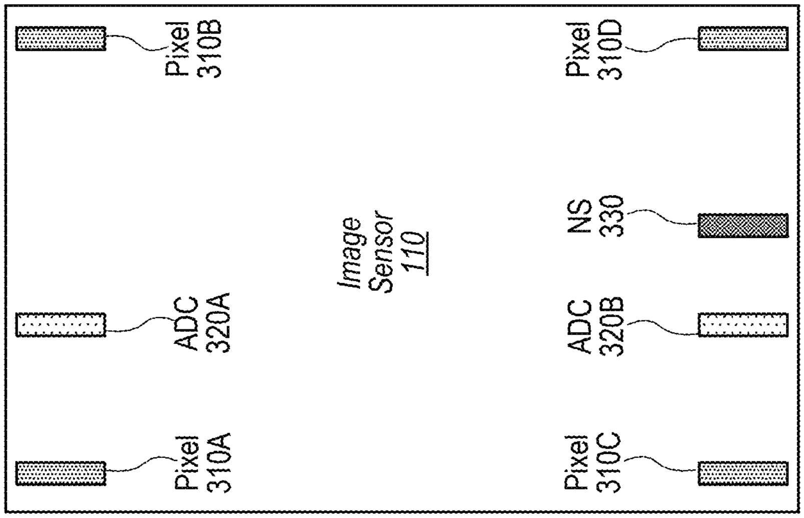
FIG. 3 depicts a plan view representation of an image sensor, according to some embodiments.

FIG. 3 depicts a plan view representation of an image sensor, according to some embodiments. In the illustrated embodiment, image sensor 110 includes pixel connections 310, ADC (analog-to-digital converter) connections 320, and noise sensing (NS) circuit connections 330. Note that multiple pins may be included at each of the illustrated connections (e.g., each connection may be a power and ground connection pair). In various embodiments, as shown in FIG. 3, image sensor 110 includes pixel connections 310A-D at each corner of the image sensor. Accordingly, power is delivered to pixels on image sensor 110 through each of the four corners of the image sensor. Power provided through pixel connections 310A-D may be shared among the pixels throughout image sensor 110. Accordingly, pixels that have a lowest impedance with respect to a particular pixel connection may primarily receive power from that particular pixel connection. For instance, a pixel may primarily receive power from the pixel connection 310 to which the pixel has the lowest impedance. Thus, a subset of pixels primarily powered by a respective pixel connection 310 (e.g., pixel connection 310) includes the pixels that have a lower impedance path to the respective pixel connection than any other pixel connection (e.g., pixel connections 310B-D) on image sensor 110. Typically, the subset of pixels for a respective pixel connection 310 are the pixels closest to the pixel connection though there may be some variation in the lower impedance path of some pixels due to design or manufacturing variation of the image sensor.

Note that while FIG. 3 depicts pixel connections 310, ADC connections 320, and noise sensing circuit connection 330 in a "north-south" arrangement with two pixel connections 310A and 310B and one ADC connection 320A on the "north" side of image sensor 110 and two pixel connections 310C and 310D, one ADC connection 320B, and NS circuit connection 330 on the "south" side of the image sensor, the connections illustrated are not intended to limit use implementations of the present disclosure. For instance, the floorplan of an image sensor may vary based on the design of an image sensor, the mounting structure for the image sensor, or other design considerations of a camera. The arrangement, number, and/or locations of pixel connections, ADC connections, and NS circuit connections may vary based on the floorplan of the image sensor.

Figure 4A:
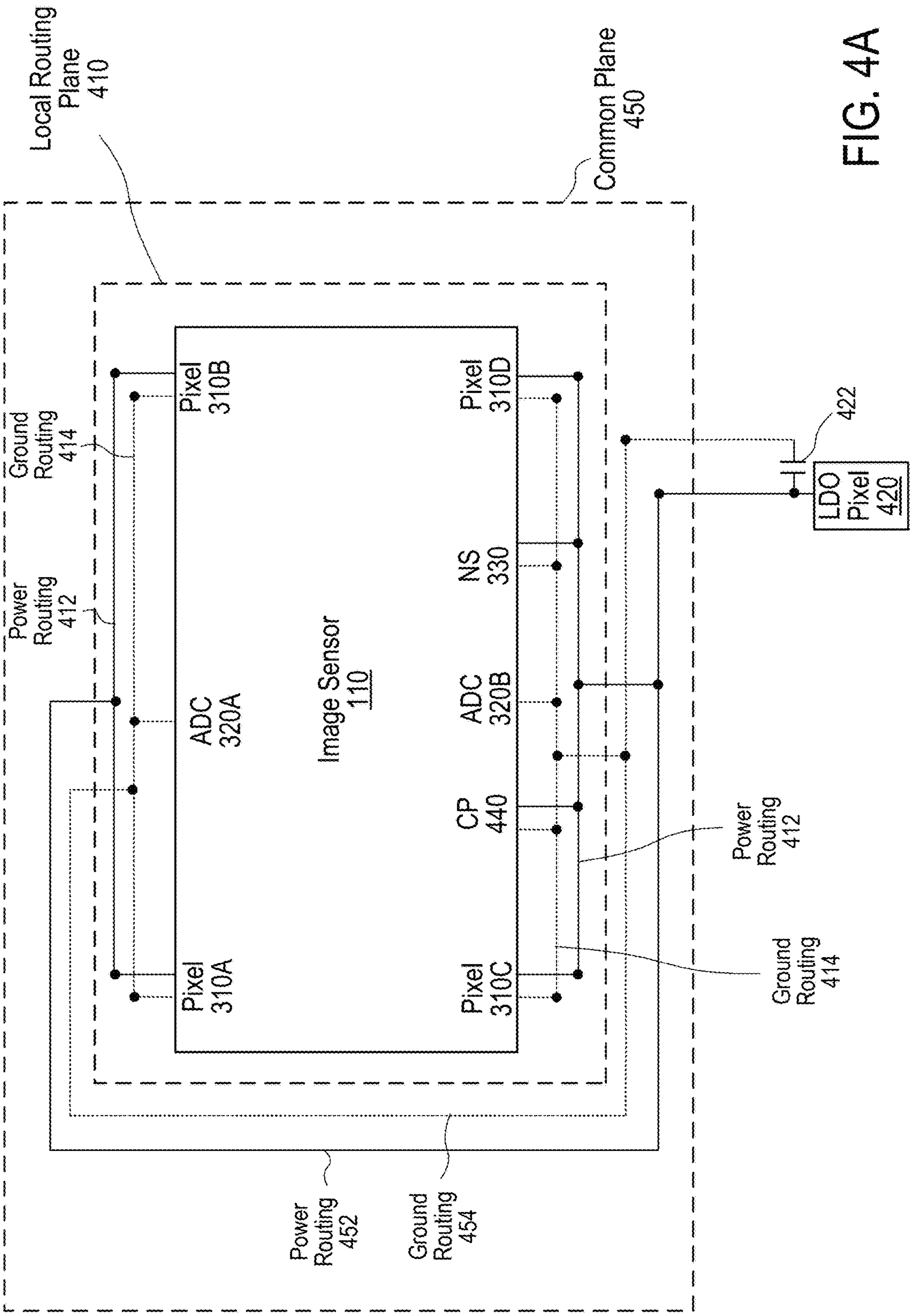
FIGS. 4A and 4B depict plan view representations of power delivery schematics for an image sensor, according to some embodiment.
Figure 4B:
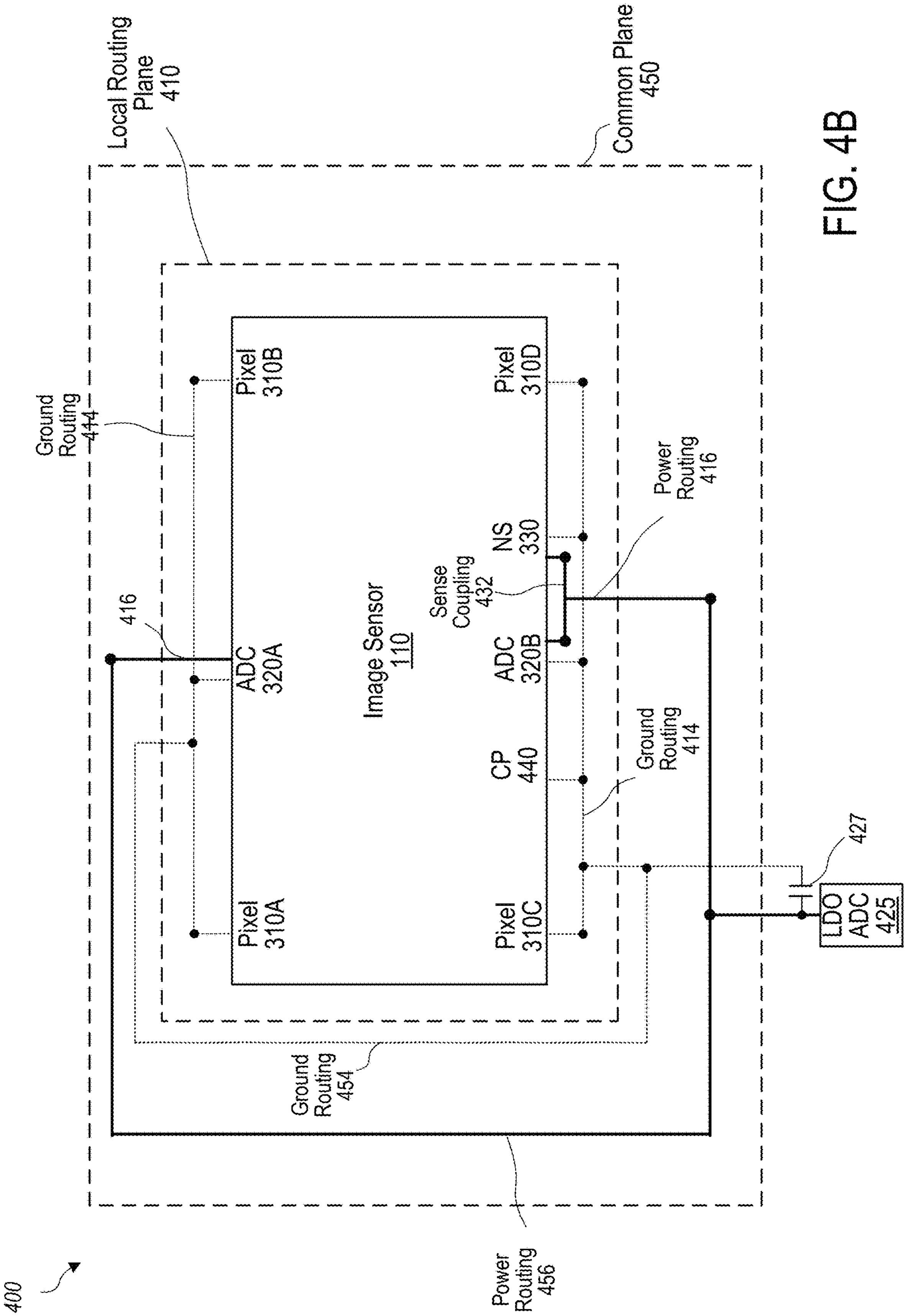

FIGS. 4A and 4B depict plan view representations of power delivery schematics for an image sensor, according to some embodiments. In the illustrated embodiments of power delivery schematic 400, the inner dashed box represents a local routing plane 410 for image sensor 110 while the outer dashed box represents a common plane 450. In various embodiments, local routing plane 410 may provide localized routings (e.g., signal routings or traces) for connections on image sensor 110 while common plane 450 provides a common routing path to power supplies (for both power and ground connections to the power supplies) for pixels and ADCs on the image sensor (e.g., LDO (low dropout regulator) pixel 420 and LDO ADC 425, respectively). In certain embodiments, common plane 450 is a low impedance common plane. For instance, common plane 450 may have lower resistance routing (such as thicker routing traces shown, by example, in FIGS. 5-6 and 8-9) to reduce the impedance of the routing.

In certain embodiments, local routing plane 410 and common plane 450 are on different substrates of camera 100. For example, local routing plane 410 may be on first substrate 125 (e.g., the ceramic substrate) and common plane 450 may be on second substrate 130 (e.g., the organic substrate). Additional embodiments may be contemplated where both local routing plane 410 and common plane 450 are on the same substrate. For instance, local routing plane 410 and common plane 450 may both be on second substrate 130. In such instances, local routing plane 410 and common plane 450 may be in different layers (e.g., routing layers) formed on the substrate. The different layers for local routing plane 410 and common plane 450 may have electrically insulating layers between them to provide electrical isolation between the planes.

FIG. 4A depicts a plan view representation of a power delivery schematic for power delivery from LDO pixel 420, according to some embodiments. As shown in FIG. 4A, image sensor 110 includes four pixel connections 310A-D, two ADC connections 320A-B, noise sensing (NS) circuit connection 330, and charge pump (CP) circuit connection 440. Note that, in FIG. 4A, both LDO pixel power connections and corresponding ground connections (e.g., power and ground pin pairs) are shown for pixel connections 310A-D, NS circuit connection 330, and CP circuit connection 440 while only ground connections are shown for ADC connections 320A-B (power connections for ADC connections 320A-B are shown in FIG. 4B, described below).

In various embodiments, image sensor 110 includes charge pump (CP) circuit connection 440. In certain embodiments, the noise sensing circuit associated with NS circuit connection 330 is a power supply rejection ratio (PSRR) circuit. The PSRR circuit may operate to sense noise that exists on power for the ADCs and attempt to cancel out the sensed noise. The charge pump circuit associated with CP circuit connection 440 may be, for example, a charge pump voltage regulator. The charge pump voltage regulator may operate to create a higher or negative voltage from the supply on image sensor 110.

In the illustrated embodiment of FIG. 4A, the power delivery connections for power to LDO pixel 420 include power routing 412 (solid line) and ground routing 414 (dotted line) in local routing plane 410. These power delivery connections in local routing plane 410 are connected to power delivery connections in common plane 450. The power delivery connections in common plane 450 include power routing 452 (solid line) and ground routing 454 (dotted line). As shown in the illustrated embodiment, power routing 412 is connected to power routing 452 and ground routing 414 is connected to ground routing 454.

In various embodiments, power routing 412 provides power signal connections in local routing plane 410 to pixel connections 310A-D, NS circuit connection 330, and CP circuit connection 440. Power routing 412 then connects to power routing 452 in common plane 450 in order to connect pixel connections 310A-D, NS circuit connection 330, and CP circuit connection 440 to power supply on LDO pixel 420. Ground routing 414 provides ground signal connections in local routing plane 410 to pixel connections 310A-D, ADC connections 320A-B, NS circuit connection 330, and CP circuit connection 440 on both the "north" (e.g., upper) side of image sensor 110 and the "south" (e.g., lower) side of the image sensor. As shown in FIG. 4A, ground routing 414 on the "north" side of image sensor 110 connects to ground routing 454 in common plane 450 (note that ground routing 414 on the "south" side of the image sensor and its connection to ground routing 454 is shown in FIG. 4B). Ground routing 454 is connected to LDO pixel 420, which may then connect to a system ground. In some embodiments, capacitor 422 is connected at the ground connection to LDO pixel 420.

FIG. 4B depicts a plan view representation of a power delivery schematic for power delivery from LDO ADC 425, according to some embodiments. Note that, in FIG. 4B, both ADC pixel power connections and corresponding ground connections (e.g., power and ground pin pairs) are shown for ADC connections 320A-B and NS circuit connection 330 while only ground connections are shown for pixel connections 310A-D and CP circuit connection 440. In the illustrated embodiment, the power delivery connections for power to LDO ADC 425 include power routing 416 and ground routing 414 in local routing plane 410 for ADC connections 320A-B. Note that NS circuit connection 330 is also connected to power routing 416 of ADC connection 320B by sense coupling 432 to allow the noise sensing circuit to sense noise on the ADC connection. Power routing 416 then connects to power routing 456 in common plane 450 in order to connect ADC connections 320A-B (and NS circuit connection 330) to power supply on LDO ADC 425.

Ground routing 414, as shown in both FIG. 4A and FIG. 4B, includes ground signal connections in local routing plane 410 to pixel connections 310A-D, ADC connections 320A-B, NS circuit connection 330, and CP circuit connection 440. FIG. 4B depicts the connection between ground routing 414 on the "south" side of image sensor 110 and ground routing 454 in common plane 450. Ground routing 454 is further connected to LDO ADC 425, which may then connect to the system ground. In some embodiments, capacitor 427 is connected at the ground connection to LDO ADC 425.

In illustrated embodiment of power delivery schematic 400, shown in FIGS. 4A and 4B, individual routing for power and ground connections on image sensor 110 are connected together in local routing plane 410 and then routed to common plane 450 through shared connections. For example, individual power routings for pixel connections 310A-D are connected together as power routing 412 in local routing plane 410 while individual ground routings for pixel connections 310A-D are also connected together as ground routing 414 in local routing plane 410.

Figure 5:
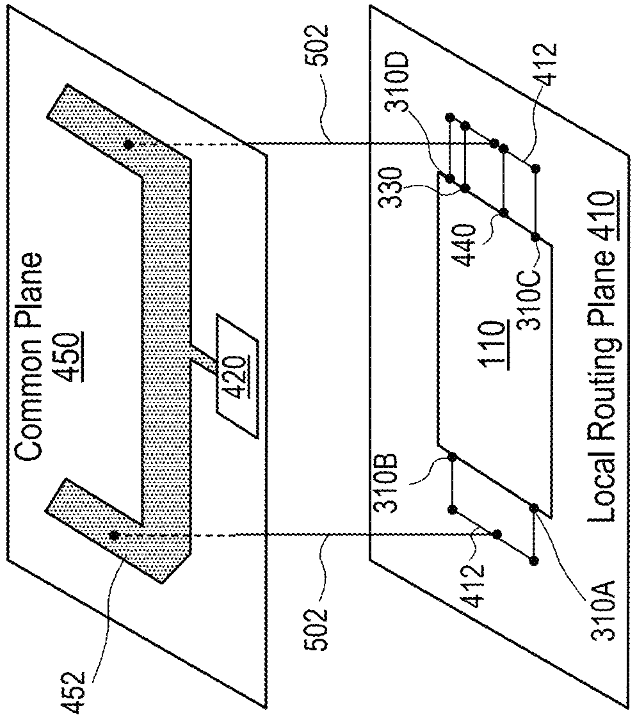
FIG. 5 depicts a three-dimensional representation of a local routing plane and a common plane with power routing for pixel connections, a noise sensing circuit connection, and a charge pump supply circuit connection, according to some embodiments.

FIG. 5 depicts a three-dimensional representation of local routing plane 410 and common plane 450 with power routing for pixel connections 310A-D, NS circuit connection 330, and CP circuit connection 440, according to some embodiments. FIG. 5 is a three-dimensional representation of the power signal routing shown in FIG. 4A. It should be noted that while FIG. 5 depicts a three-dimensional view of only power routing topology based on the plan view of both the power and ground routing shown in FIG. 4A, a similar three-dimensional ground routing topology may be realized based on the plan view of FIG. 4A.

In the illustrated embodiment of FIG. 5, pixel connections 310A-D are connected to power routing 412 in local routing plane 410 on either side of image sensor 110 (e.g., the "north" and "south" sides of the image sensor). NS circuit connection 330 and CP circuit connection 440 are also connected to power routing 412. Power routing 412 is then connected to power routing 452 in common plane 450 by interplane power routing 502. Power routing 452 then provides a common connection to LDO pixel 420 in common plane 450. In various embodiments, as shown in FIG. 5, power routing 452 has a large thickness to lower the impedance of the power routing in common plane 450. Ground routing 454, shown in FIG. 4A, may also have a large thickness to lower the impedance of the ground routing in common plane 450.

As shown in FIGS. 4A and 5, the distances travelled by power/ground signals from each of pixel connections 310A-D may be different. For instance, since pixel connections 310A-B are connected together in local routing plane 410 and pixel connections 310C-D are connected together in the local routing plane at a different location, there may be variation in these connections (e.g., lengths or thicknesses) that cause non-uniformity (e.g., mismatching) in the impedance between routings to different pixel connections 310A-D and LDO pixel 420.

In various embodiments, pixel noise may be generated due to the load that is being pulled in at pixel connections 310A-D. Variations in the pixel load profile due to IR drops and transient behavior of the power supply (LDO pixel 420) may cause pixel noise to be present at pixel connections 310A-D. Noise at pixel connections 310A-D may be transmitted and sensed by the noise sensing circuit at NS circuit connection 330. Accordingly, pixel connections 310A-D may be considered "aggressors" on the "receiver" NS circuit connection 330 with any noise transmission by the pixel connections.

Any mismatch in the impedance between different individual routings to pixel connections 310A-D increases the noise generated when pixels are switching at their determined frequency. The increase in the transmitted noise due to mismatched impedance may inhibit the noise sensing circuit (at NS circuit connection 330) from being able to correctly compensate for noise sensed at the power connection for ADC connection 320B. This aggression by pixel connections 310A-D due to mismatches in impedance may contribute to vertical shading on images captured by image sensor 110 (e.g., changes in image brightness vertically across the images) that may reduce the quality of the captured images.

In various embodiments, as shown in FIGS. 4A and 4B, image sensor 110 includes a charge pump voltage regulator connected to a CP circuit connection 440. As described above, the charge pump voltage regulator is utilized to create high voltage from lower voltages.

Figure 6:
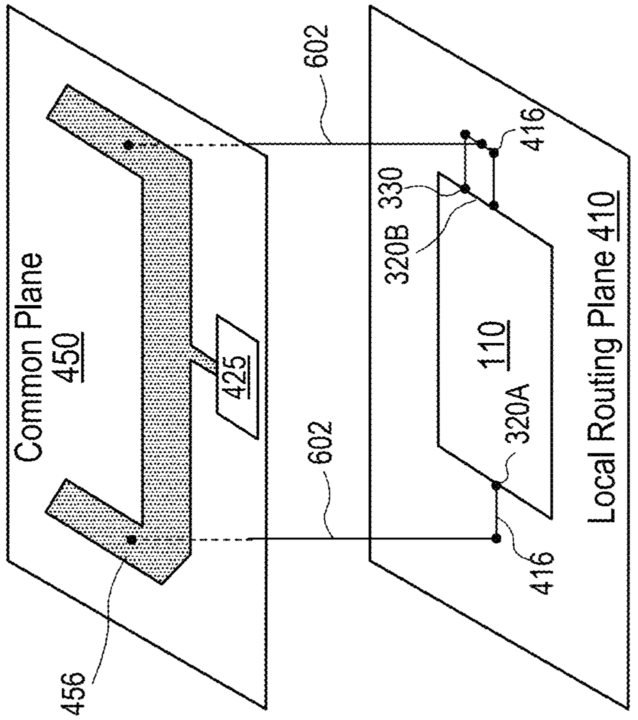
FIG. 6 depicts a three-dimensional representation of a local routing plane and a common plane with power routing for ADC (analog-to-digital converter) connections and a noise sensing circuit connection, according to some embodiments.

FIG. 6 depicts a three-dimensional representation of local routing plane 410 and common plane 450 with power routing for ADC connections 320A-B and NS circuit connection 330, according to some embodiments. FIG. 6 is a three-dimensional representation of the power signal routing shown in FIG. 4B. It should be noted that while FIG. 6 depicts a three-dimensional view of only power routing topology based on the plan view of both the power and ground routing shown in FIG. 4B, a similar three-dimensional ground routing topology may be realized based on the plan view of FIG. 4B. In the illustrated embodiment of FIG. 6, ADC connections 320A-B and NS circuit connection 330 are connected to power routing 416 in local routing plane 410. Power routing 416 is then connected to power routing 456 in common plane 450 by interplane power routing 602. Power routing 456 then provides a common connection to LDO ADC 425 in common plane 450. In various embodiments, as shown in FIG. 6, power routing 456 has a large thickness to lower the impedance of the power routing in common plane 450.

As shown in FIGS. 4B and 6, the distances travelled by power/ground signals from each of ADC connections 320A-B may be different. For instance, since ADC connection 320A has its own power routing in local routing plane 410 and ADC connection 320B shares power routing with NS circuit connection 330 in the local routing plane at a different location, there may be variation in these connections (e.g., lengths or thicknesses) that cause non-uniformity (e.g., mismatching) in the impedance between routings to different ADC connections 320A-B and LDO ADC 425.

Additionally, it should be noted that, as shown in FIG. 4B, CP circuit connection 440 has its ground connected to ground routing 414 near where ADC connection 320B has its ground connected to the ground routing. In various embodiments, the charge pump voltage regulator associated with CP circuit connection 440 switches at its determined frequency and may generate noise due to the switching. Noise may also be generated due to internal loading of the charge pump voltage regulator. In some embodiments, noise generated by the charge pump voltage regulator may transmit to ground of other components through its connection to ground routing 414 at CP circuit connection 440. For instance, noise may be transferred through the shared ground routing 414, as shown in FIG. 4B, between CP circuit connection 440 and ADC connection 320B (note that some noise may also be transferred to ADC connection 320A though the transmitted noise is likely less than the noise received at ADC connection 320B). This transmitted noise may cause an imbalance at the ground that affects how photoelectrons get converted to electrons by the pixels in image sensor 110. Thus, CP circuit connection 440 may be considered an "aggressor" to "receiver" ADC connections 320A-B with any ground noise transmission by charge pump voltage regulator. Any aggression by CP circuit connection 440 due to ground noise transmission may contribute to horizontal shading on images captured by image sensor 110 (e.g., changes in image brightness horizontally across the images) that may reduce the quality of the captured images.

To overcome the noise transmission issues due to "aggressors" and "receivers" in power delivery schematic 400 described above along with other similar power delivery schematics with localized power/ground routing, the present disclosure contemplates embodiments of power delivery schematics that utilize a common plane to provide reduced impedance and better impedance matching for routings to connections of an image sensor. For instance, the contemplated embodiments implement routing paths through the common plane that provide better matching of impedances between different routings for the same types of connections (e.g., impedance matching between routings to pixel connections 310A-D). The better matching of impedances reduces noise transmission effects related to non-uniformity in impedance across an image sensor and its corresponding substrates. Additionally, the contemplated power delivery schematics of the present disclosure provide isolations between various connection elements (such as CP circuit connection 440 and ADC connections 320A-B) in order to reduce noise transmissions between the elements.

Figure 7A:
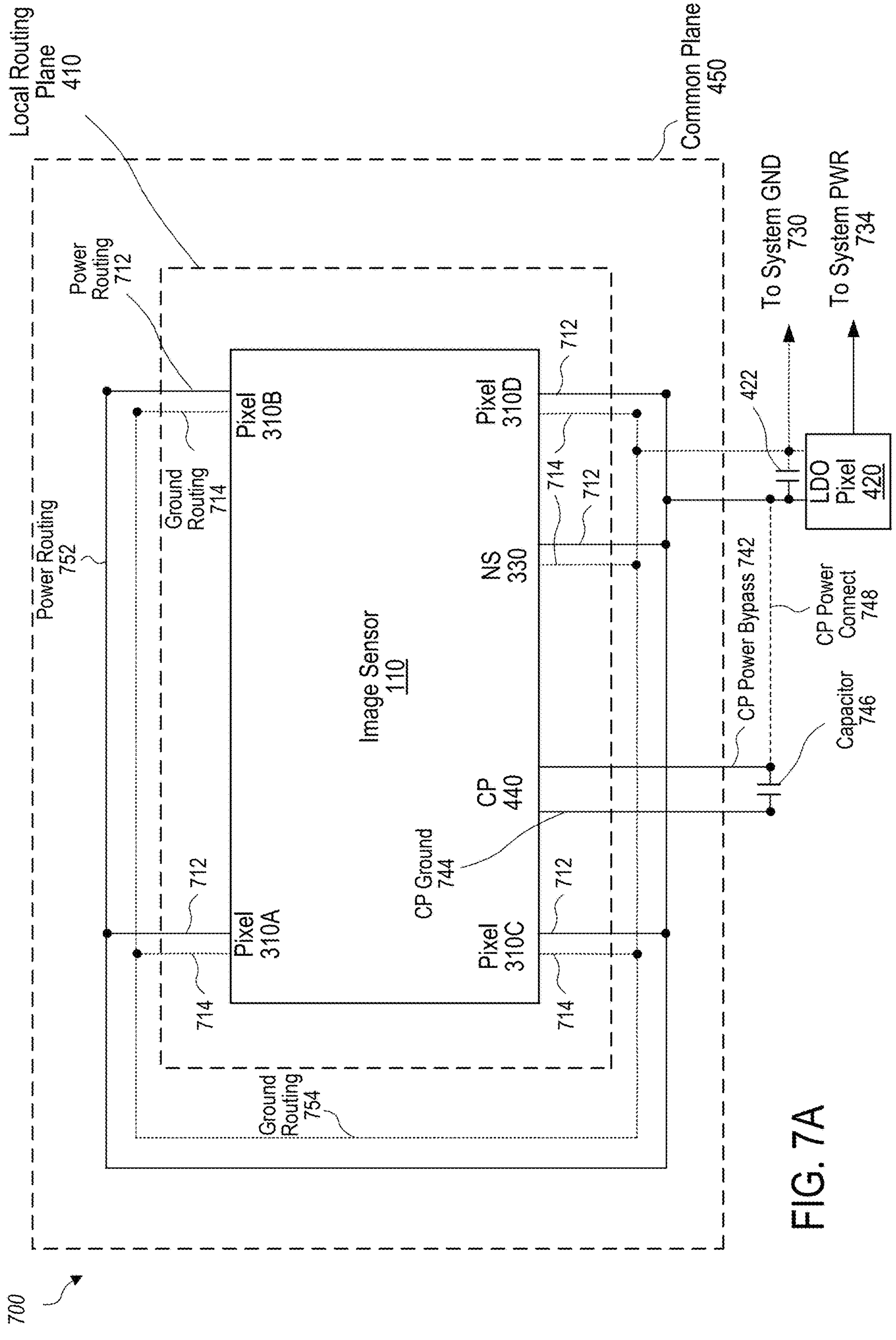
FIGS. 7A and 7B depict plan view representations of another power delivery schematic for an image sensor, according to some embodiments.
Figure 7B:
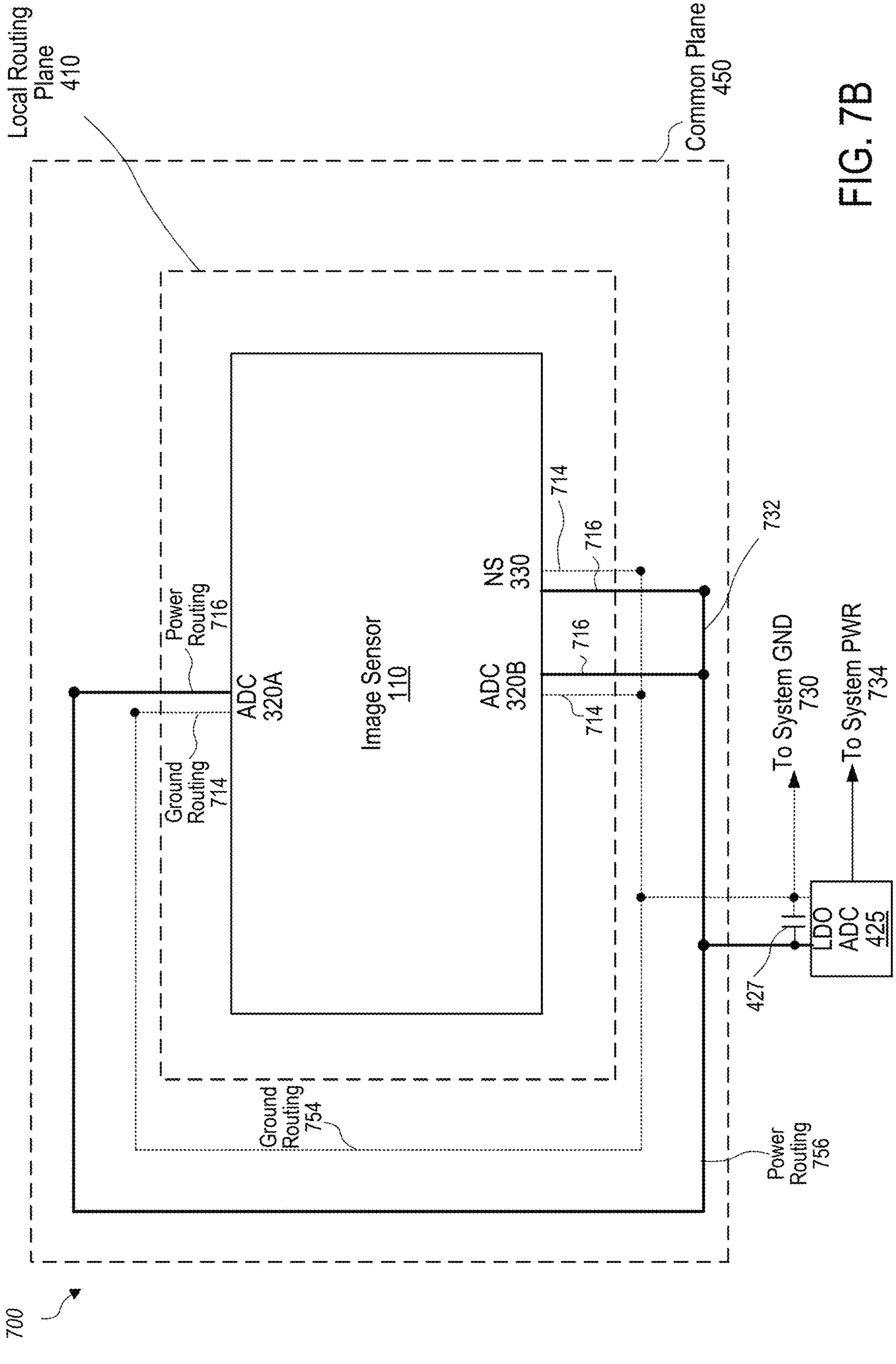

FIGS. 7A and 7B depict plan view representations of another power delivery schematic for an image sensor, according to some embodiments. In the illustrated embodiments, power delivery schematic 700 includes local routing plane 410 (inner dashed box) and common plane 450 (outer dashed box) for image sensor 110. In contrast to the embodiment of power delivery schematic 400, shown in FIGS. 4A and 4B, power delivery schematic 700 includes individual routings through local routing plane 410 for each connection on image sensor 110. For instance, as shown in FIG. 7A, pixel connections 310A-D have individual power routings 712 and ground routings 714 that pass through local routing plane 410 and into common plane 450.

FIG. 7A depicts a plan view representation of power delivery schematic 700 for power delivery from LDO pixel 420, according to some embodiments. In the illustrated embodiment of FIG. 7A, the power delivery connections in local routing plane 410 include individual power routings 712 (solid line) and individual ground routings 714 (dotted line) for pixel connections 310A-D and NS circuit connection 330. Note that ADC connections 320A-B are not shown in the illustration of FIG. 7A. The power delivery connections in common plane 450 include power routing 752 (solid line) and ground routing 754 (dotted line). As shown in the illustrated embodiment, individual power routings 712 connect to power routing 752 and individual ground routings 714 connect to ground routing 754. CP circuit connection 440 also has its own power routing (CP power bypass 742) and ground routing (CP ground 744), which are further described below.

In certain embodiments, individual power routings 712 provide individual power signal routings through local routing plane 410 from both pixel connections 310A-D and NS circuit connection 330 to common plane 450. Individual power routings 712 then connect to power routing 752 in common plane 450 in order to connect pixel connections 310A-B and NS circuit connection 330 to power supply on LDO pixel 420. Individual ground routings 714 provide individual ground signal routings through local routing plane 410 from all of pixel connections 310A-B, ADC connections 320A-B, and NS circuit connection 330 to common plane 450. Individual ground routings 714 then connect to ground routing 754 in common plane 450. Ground routing 754 is connected to LDO pixel 420 at capacitor 422. Ground routing 754 may also be connected to system ground 730 while LDO pixel 420 is connected to system power 734. Accordingly, the power and ground connections to system ground 730 and system power 734 go through LDO pixel 420 and capacitor 422.

FIG. 7B depicts a plan view representation of power delivery schematic 700 for power delivery from LDO ADC 425, according to some embodiments. In the illustrated embodiment of FIG. 7B, the power delivery connections in local routing plane 410 include individual power routings

716 (thick solid line) and individual ground routings 714 (dotted line) for ADC connections 320A-B and NS circuit connection 330. Note that pixel connections 310A-D and CP circuit connection 440 are not shown in the illustration of FIG. 7B. The power delivery connections in common plane 450 include power routing 756 (thick solid line) and ground routing 754 (dotted line). As shown in the illustrated embodiment, individual power routings 716 connect to power routing 756 and individual ground routings 414 connect to ground routing 454.

In certain embodiments, individual power routings 716 provide power signal connections through local routing plane 410 from ADC connections 320A-B to common plane 450. Individual power routings 716 then connect to power routing 756 in common plane 450 in order to connect ADC connections 320A-B to power supply on LDO ADC 425. NS circuit connection 330 is also connected, by power routing 756 in common plane 450, to the individual power routing 716 of ADC connection 320B by sense coupling 732 to allow the noise sensing circuit to sense noise on the power routing to the ADC connection. The noise sensing circuit, which receives power from power routing 752 in common plane 450 via power routing 712 and NS circuit connection 330, may also sense noise associated with power for pixel connections 310A-D (as shown in FIG. 7A). As shown in FIG. 7B, ground routing 754 is connected to LDO ADC 425 at capacitor 427 while also being connected to system ground 730. LDO ADC 425 is then further connected to system power 734. Accordingly, the power and ground connections to system ground 730 and system power 734 go through LDO ADC 425 and capacitor 427.

Figure 8:
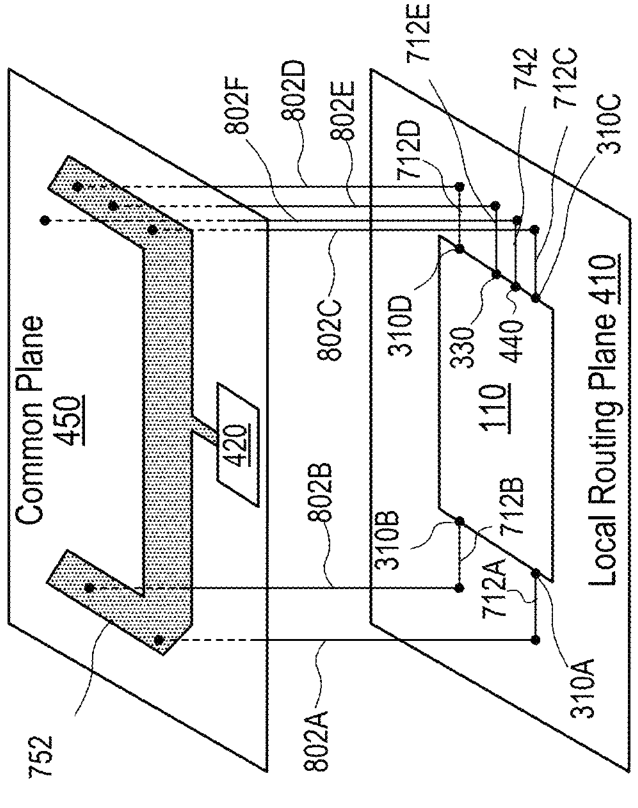
FIG. 8 depicts a three-dimensional representation of a local routing plane and a common plane with individual power routings for pixel connections, according to some embodiments.

Turning back to FIG. 7A, individual power routings 712 and ground routings 714 are illustrated to pass through local routing plane 410 and connect to power routing 752 and ground routing 754, respectively, in common plane 450. FIG. 8 depicts a three-dimensional representation of local routing plane 410 and common plane 450 with individual power routings for pixel connections 310A-D, according to some embodiments. FIG. 8 is a three-dimensional representation of the power signal routing shown in FIG. 7A. It should be noted that while FIG. 8 depicts a three-dimensional view of only power routing topology based on the plan view of both the power and ground routing shown in FIG. 7A, a similar three-dimensional ground routing topology may be realized based on the plan view of FIG. 7A.

In the illustrated embodiment of FIG. 8, pixel connections 310A-D are connected to corresponding individual power routings 712A-D. Additionally, NS circuit connection 330 is connected to its individual power routing 712E and CP circuit connection is connected to CP power bypass 742. Individual power routings 712A-E and CP power bypass 742 pass independently through local routing plane 410 and connect to their corresponding individual interplane power routings 802A-F. Thus, pixel connections 310A-D are independently connected to power routing 752 in common plane 450 by their corresponding individual power routings 712A-D and interplane power routings 802A-D. Similarly, NS circuit connection 330 is connected to power routing 752 in common plane 450 by its individual power routing 712E and interplane power routing 802E. Power routing 752 connects to LDO pixel 420 in common plane 450 to provide power supply to pixel connections 310A-D and NS circuit connection 330. In various embodiments, as shown in FIG. 8, power routing 752 has a large thickness to lower the impedance of the power routing in common plane 450. Similarly, any ground routing in common plane (such as ground routing 754, shown in FIG. 7A) may have a large thickness to lower the impedance of the ground routing in the common plane.

As shown in FIG. 8, the distances travelled by power signals from each of pixel connections 310A-D are relatively similar due to the individual power routing paths between each pixel connection and power routing 752 in common plane 450. With the similar distances for power routing paths between pixel connections 310A-D and LDO pixel 420, impedances of the power routings to pixel connections 310A-D may be matched more closely to each other. Note that matching of impedances may include matching of the power connections, matching of the ground connections and matching of the sum of power and ground connections. Additionally, the low impedance of power routing 752 (e.g., due to its large thickness) reduces any variations in impedance that may be caused by differences in the distances travelled by power signals between the connections to individual power routings at power routing 752 (e.g., connections between interplane power routings 802A-D and power routing 752) and LDO pixel 420 within common plane 450. Similar routing distances and paths may be experienced by ground signal routings between pixel connections 310A-D and the ground of LDO pixel 420, as shown in FIG. 7A.

Another advantage of power delivery schematic 700 is that any impedance mismatches in the individual routings between pixel connections 310A-D and common plane 450 may further be reduced through design of individual power routings 712 or individual ground routings 714. For instance, the thickness and/or paths (e.g., routes) of individual power routings 712 or individual ground routings 714 may be designed to reduce any impedance mismatch in the routings between the pixel connections and the common plane. Accordingly, power delivery schematic 700, as shown in FIGS. 7A and 8, provides a design that minimizes mismatching of impedances between power signal routings or ground signal routings while allowing for adaptive design further reduce any mismatch between the impedances.

Similar advantages with respect to close matching of impedances and design of individual routings may be realized for ADC connections 320A-B. For instance, as shown in FIG. 7B, ADC connections 320A-B, similar to pixel connections 310A-D, have individual power routings 716 and ground routings 714. Individual power routings 716 pass through local routing plane 410 and connect to power routing 756 in common plane 450. Additionally, NS circuit connection 330 has its own individual power routing 716 and individual ground routing 714 that pass through local routing plane 410 and connect to power routing 756 and ground routing 754, respectively, in common plane 450. As described above, the noise sensing circuit associated with NS circuit connection 330 can sense noise on power routing 752 (e.g., power for the pixels) and power routing 756 (e.g., power for ADCs) since the NS circuit connection is connected to both power routings in common plane 450 (e.g., to power routing 752 through its individual power routing 712 and to power routing 756 through sense coupling 732). Moving the common power and ground connections to common plane 450 for routings to NS circuit connection 330 provides some noise isolation for the noise sensing circuit from other connections on image sensor 110.

Figure 9:
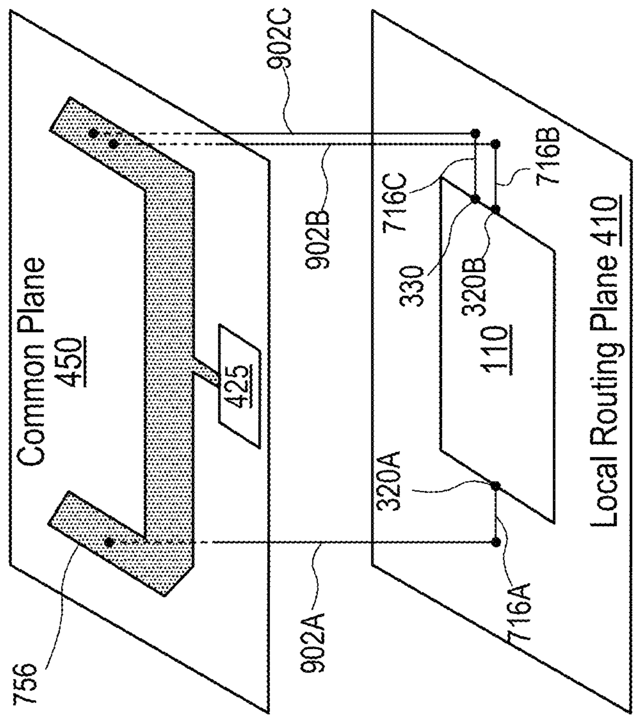
FIG. 9 depicts a three-dimensional representation of a local routing plane and a common plane with individual power routings for ADC (analog-to-digital converter) connections, according to some embodiments.

As shown in FIG. 7B, ADC connections 320A-B have distances travelled by power signals and ground signals to LDO ADC 425 that are relatively similar due to the individual power routing paths between each ADC connection and power routing 756 and ground routing 752 in common plane 450. FIG. 9 depicts a three-dimensional representation of local routing plane 410 and common plane 450 with individual power routings for ADC connections 320A-B, according to some embodiments. FIG. 9 is a three-dimensional representation of the power signal routing shown in FIG. 7B. It should be noted that while FIG. 9 depicts a three-dimensional view of only power routing topology based on the plan view of both the power and ground routing shown in FIG. 7B, a similar three-dimensional ground routing topology may be realized based on the plan view of FIG. 7B.

In the illustrated embodiment of FIG. 9, ADC connections 320A-B are connected to corresponding individual power routings 716A-B. Additionally, NS circuit connection 330 has its corresponding individual power routing 716C. For ADC connections 320A-B, individual power routings 716A-B pass independently through local routing plane 410 and connect to their corresponding individual interplane power routings 902A-B. Individual power routing 716C for NS circuit connection 330 passes independently through local routing plane 410 and connects to its corresponding individual interplane power routings 902C. Thus, ADC connections 320A-B and NS circuit connection 330 are independently connected to power routing 756 in common plane 450 by their corresponding individual power routings 714A-C and interplane power routings 902A-C. Power routing 756 connects to the supply of LDO ADC 425 in common plane 450 to provide power to ADC connections 320A-B. In various embodiments, as shown in FIG. 9, power routing 756 has a large thickness to lower the impedance of the power routing in common plane 450. Ground routing 454, shown in FIG. 7B, may also have a large thickness to lower the impedance of the ground routing in common plane 450.

As shown in FIG. 9, the distances travelled by power signals from each of ADC connections 320A-B are relatively similar due to the individual power routing paths between each ADC connection and power routing 756 in common plane 450. With the similar distances for power routing paths between ADC connections 320A-B and LDO ADC 425, impedances of the power routings to ADC connections 320A-B may be matched more closely to each other. Additionally, the low impedance of power routing 756 (e.g., due to its large thickness) reduces any variations in impedance that may be caused by differences in the distances travelled by power signals between the connections to individual power routings at power routing 756 (e.g., connections between interplane power routings 902A-B and power routing 756) and LDO ADC 425 within common plane 450. Similar routing distances and paths may be experienced by ground signal routings between ADC connections 320A-B and the ground of LDO ADC 425.

With the similar distances for power routing paths and ground routing paths between ADC connections 320A-B and LDO ADC 425, impedances of the power and ground routings to ADC connections 320A-B may be matched more closely to each other. Additionally, power routing 756 (e.g., due to its having a large thickness availability in common plane 450) reduces any variations in impedance that may be caused by differences in the distances travelled by power signals between the connections to individual power routings at power routing 756 and LDO ADC 425 within common plane 450. Any impedance mismatches in the individual routings between ADC connections 320A-B and common plane 450 may further be reduced through design of individual power routings 716 or individual ground routings 714. For instance, the thickness and/or paths (e.g., routes) of individual power routings 716 or individual ground routings 714 may be designed to reduce any impedance mismatch in the routings between the ADC connections and the common plane.

As shown in FIGS. 7A-9, the individual routings for pixel connections 310A-D and ADC connections 320A-B reduces the noise coupled from the pixel and ADC connections (e.g., the aggressors) to receivers (such as NS circuit connection 330 or CP circuit connection 440) due to the non-shared nature of the individual routings. Additionally, with close matching of the impedances between the individual routings for pixel connections 310A-D, as well as ADC connections 320A-B, aggression by pixel connections 310A-D or ADC connections 320A-B due to mismatches in impedance is reduced in power delivery schematic 700 as compared to power delivery schematic 400 (shown in FIGS. 4A and 4B). The reduction in aggression reduces noise from pixel connections 310A-D or ADC connections 320A-B sensed at NS circuit connection 330 and the noise sensing circuit. Further, any noise sensed at NS circuit connection 330 and the noise sensing circuit is associated with matched impedance. Accordingly, the noise sensing circuit may more accurately and equally compensate for noise sensed at the power connection and vertical shading on images captured by image sensor 110 may be reduced. The reduction in vertical shading may improve image quality in the images captured by image sensor 110.

As further illustration of the advantages of power delivery schematic 700, impedances of the power routings, or the ground routings, an average impedance difference for a set of routings between pixel connections 310A-D and common plane 450 may be calculated. In the embodiment of power delivery schematic 700, there are four pixel connections 310A-D with four corresponding power signal routings and four corresponding ground signal routings between the pixel connections and common plane 450. With four signal routings in a set of routings (e.g., either power or ground) between the pixel connections and common plane 450, there are six percentage differences in impedance that can be calculated. The average percentage difference in impedance for the four power signal routings may then be the sum of the six percentage differences divided by six. In this calculation, percentage difference is be calculated as: the absolute value of the difference between Impedance 1 and Impedance 2 (e.g., Impedance 1−Impedance 2) divided by the average of Impedance 1 and Impedance 2 (e.g., (Impedance 1+Impedance 2)/2).

In certain embodiments, the power routings or the ground routings between pixel connections 310A-D and common plane 450 in power delivery schematic 700 have an average percentage difference of at most 5%. In some embodiments, the average percentage difference may be at most 10%. In contrast, the power routings or the ground routings between pixel connections 310A-D and common plane 450 in power delivery schematic 400, shown in FIG. 4, may have an average percentage difference of at least 25%. As shown by these average percentage differences, power delivery schematic 700 has less impedance mismatch between routings (either power or ground) than power delivery schematic 400.

In certain embodiments, the power routings or the ground routings between ADC connections 320A-B and common plane 450 in power delivery schematic 700 have an average percentage difference of at most 5%. In some embodiments, the average percentage difference may be at most 10%. In contrast, the power routings or the ground routings between ADC connections 320A-B and common plane 450 in power delivery schematic 400, shown in FIG. 4, may have an average percentage difference of at least 25%.

In various embodiments, as shown in FIG. 7A, image sensor 110 includes a charge pump voltage regulator that is connected to at CP circuit connection 440. As described above, the charge pump voltage regulator is utilized to create high voltage from lower voltages but may generate noise due to its switching that is received by ADC connections 320A-B. In certain embodiments, CP circuit connection 440 is given its own individual routings through both local routing plane 410 and common plane 450 to attempt to close the charge pump loop and reduce the effects of noise from switching of the charge pump voltage regulator.

In the illustrated embodiment of FIG. 7A, CP circuit connection is connected to CP power bypass 742 for its individual power routing and CP ground 744 for its individual ground routing. In some embodiments, CP power bypass 742 and CP ground 744 pass through both local routing plane 410 and common plane 450 without any connections (e.g., CP power bypass 742 and CP ground 744 bypass common plane 450). In some embodiments, CP power bypass 742 and CP ground 744 may connect to their own connections in the common plane (e.g., connections separate from power routing 752 and ground routing 754 in the common plane). In certain embodiments, CP power bypass 742 is star connected to capacitor 746 and LDO pixel 420 using CP power connect 748. CP power connected may, as described above, be located outside common plane 450 or in the common plane but separate from other routing. CP power bypass 742 may be connected to capacitor 746 at or near where CP power bypass 742 attaches to CP power connect 748. Capacitor 746 may be, for example, a decoupling capacitor. The decoupling capacitor may provide isolation (e.g., filtering) of the charge pump voltage regulator supply before any noise gets to common plane 450.

With the utilization of CP ground 744, CP circuit connection 440 is isolated from individual ground routing 714B for ADC connection 320B. Additionally, CP ground 744 may be connected to system ground 730 separately from ground routing 754, which is connected to other elements of image sensor 110. In certain embodiments, as shown in FIG. 7A, CP ground 744 is star connected to system ground 730 and capacitor 746. Connecting CP ground 744 to system ground 730 away from ground routing 754 in common plane 450, which can be a sensitive analog ground, may filter some noise off of CP ground 744 and CP circuit connection 440. Capacitor 746 may also provide some filtering of noise for CP ground 744 and CP circuit connection 440.

Connecting CP circuit connection 440 directly to system ground 730 with CP ground 744 bypassing local routing plane 410 and power/ground routings in common plane 450 provides isolation between noise on the charge pump voltage regulator and both pixel connections 310A-D and ADC connections 320A-B. This isolation of noise between the charge pump voltage regulator and both pixel connections 310A-D and ADC connections 320A-B on image sensor 110 may reduce the aggression asserted by CP circuit connection 440 on ADC connections 320A-B due to ground noise transmission. Reduction of the aggression of CP circuit connection 440 may reduce horizontal shading on images captured by image sensor 110. Reduction of the horizontal shading may increase the quality of the captured images.

Example Methods

Figure 10:
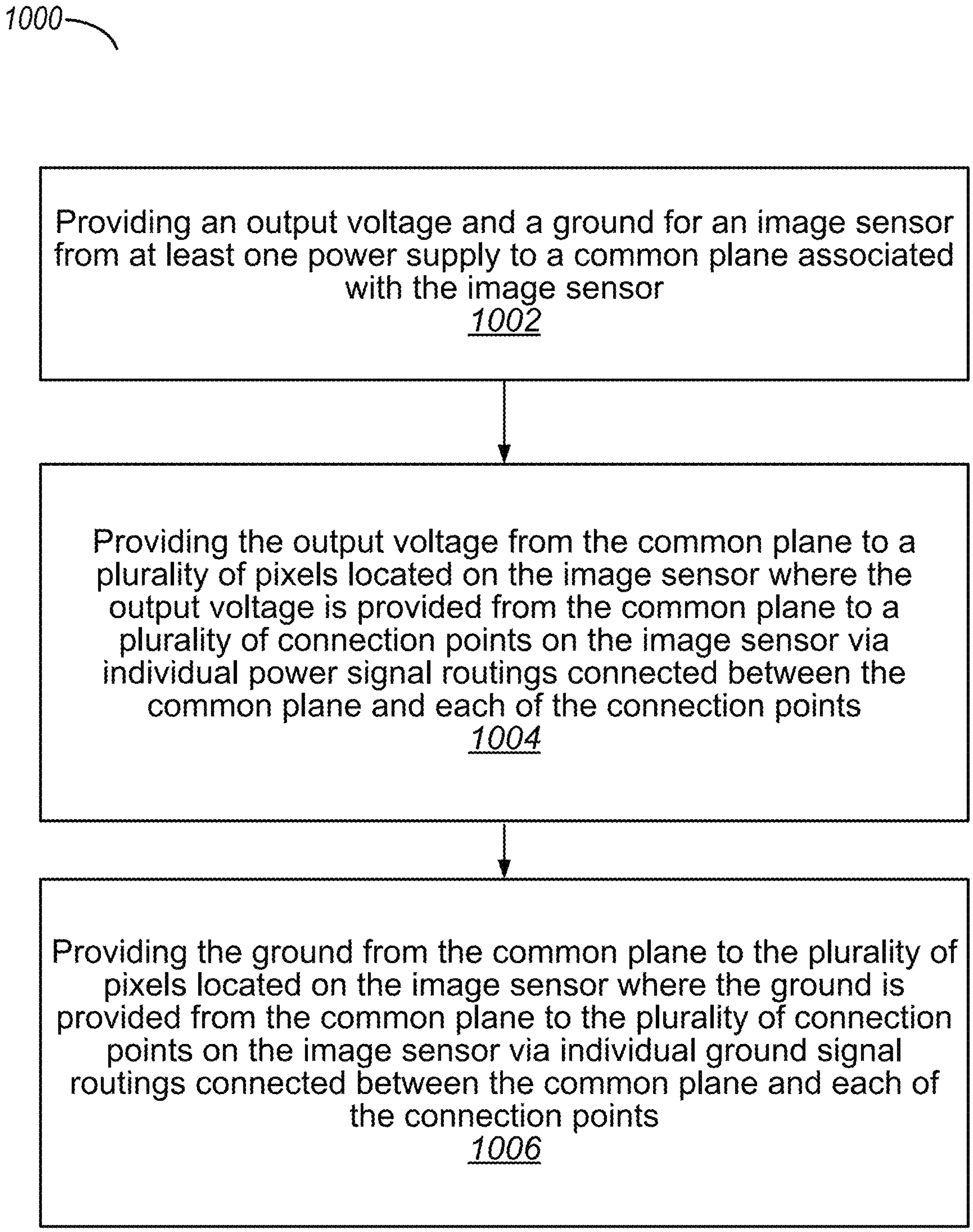
FIG. 10 is a flow diagram illustrating a method for providing power to an image sensor, according to some embodiments.

FIG. 10 is a flow diagram illustrating a method for providing power to an image sensor, according to some embodiments. Method 1000 may be implemented using any of the embodiments of an image sensor described with respect to FIGS. 1-3 and 7-9, in conjunction with any circuitry or other mechanism in a camera.

At 1002, in the illustrated embodiment, an output voltage and a ground for an image sensor is provided from at least one power supply to a common plane associated with the image sensor.

At 1004, in the illustrated embodiment, the output voltage is provided from the common plane to a plurality of pixels located on the image sensor where the output voltage is provided from the common plane to a plurality of connection points on the image sensor via individual power signal routings connected between the common plane and each of the connection points.

At 1006, in the illustrated embodiment, the ground is provided from the common plane to the plurality of pixels located on the image sensor where the ground is provided from the common plane to the plurality of connection points on the image sensor via individual ground signal routings connected between the common plane and each of the connection points.

In some embodiments, an additional output voltage and an additional ground for the image sensor are provided from at least one additional power supply to the common plane associated with the image sensor. The additional output voltage is provided from the common plane to a plurality of analog to digital converters (ADCs) located on the image sensor where the additional output voltage is provided from the common plane to each of the ADCs on the image sensor via individual ADC power signal routings connected between the common plane and each of the ADCs. The additional ground is provided from common plane to the plurality of ADCs located on the image sensor, wherein the additional ground is provided from the common plane to each of the ADCs on the image sensor via individual ADC ground signal routings connected between the common plane and each of the ADCs.

Figure 11:
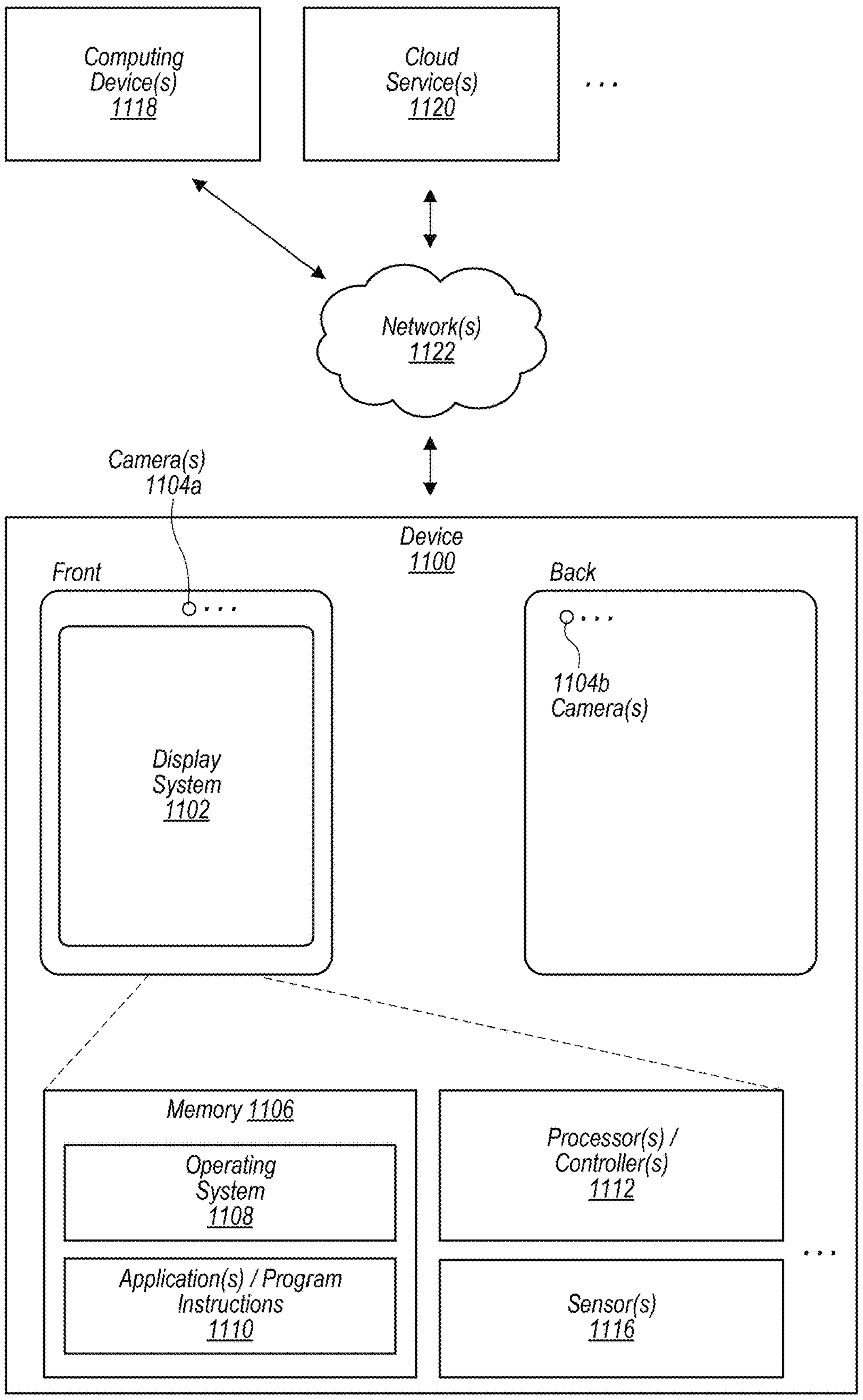
FIG. 11 illustrates a schematic representation of an example device that may include a camera, in accordance with some embodiments.

FIG. 11 illustrates a schematic representation of an example device 1100 that may include a camera (e.g., as described herein with respect to FIG. 1), in accordance with some embodiments. In some embodiments, the device 1100 may be a mobile device and/or a multifunction device. In various embodiments, the device 1100 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 1100 may include a display system 1102 (e.g., comprising a display and/or a touch-sensitive surface) and/or one or more cameras 1104. In some non-limiting embodiments, the display system 1102 and/or one or more front-facing cameras 1104*a* may be provided at a front side of the device 1100, e.g., as indicated in FIG. 11. Additionally, or alternatively, one or more rear-facing cameras 1104*b* may be provided at a rear side of the device 1100. In some embodiments comprising multiple cameras 1104, some or all of the cameras may be the same as, or similar to, each other. Additionally, or alternatively, some or all of the cameras may be different from each other. In various embodiments, the location(s) and/or arrangement (s) of the camera(s) 1104 may be different than those indicated in FIG. 11.

Among other things, the device 1100 may include memory 1106 (e.g., comprising an operating system 1108 and/or application(s)/program instructions 1110), one or more processors and/or controllers 1112 (e.g., comprising CPU(s), memory controller(s), display controller(s), and/or camera controller(s), etc.), and/or one or more sensors 1116 (e.g., orientation sensor(s), proximity sensor(s), and/or position sensor(s), etc.). In some embodiments, the device 1100 may communicate with one or more other devices and/or services, such as computing device(s) 1118, cloud service(s) 1120, etc., via one or more networks 1122. For example, the device 1100 may include a network interface (e.g., network interface 1210) that enables the device 1100 to transmit data to, and receive data from, the network(s) 1122. Additionally, or alternatively, the device 1100 may be capable of communicating with other devices via wireless communication using any of a variety of communications standards, protocols, and/or technologies.

Figure 12:
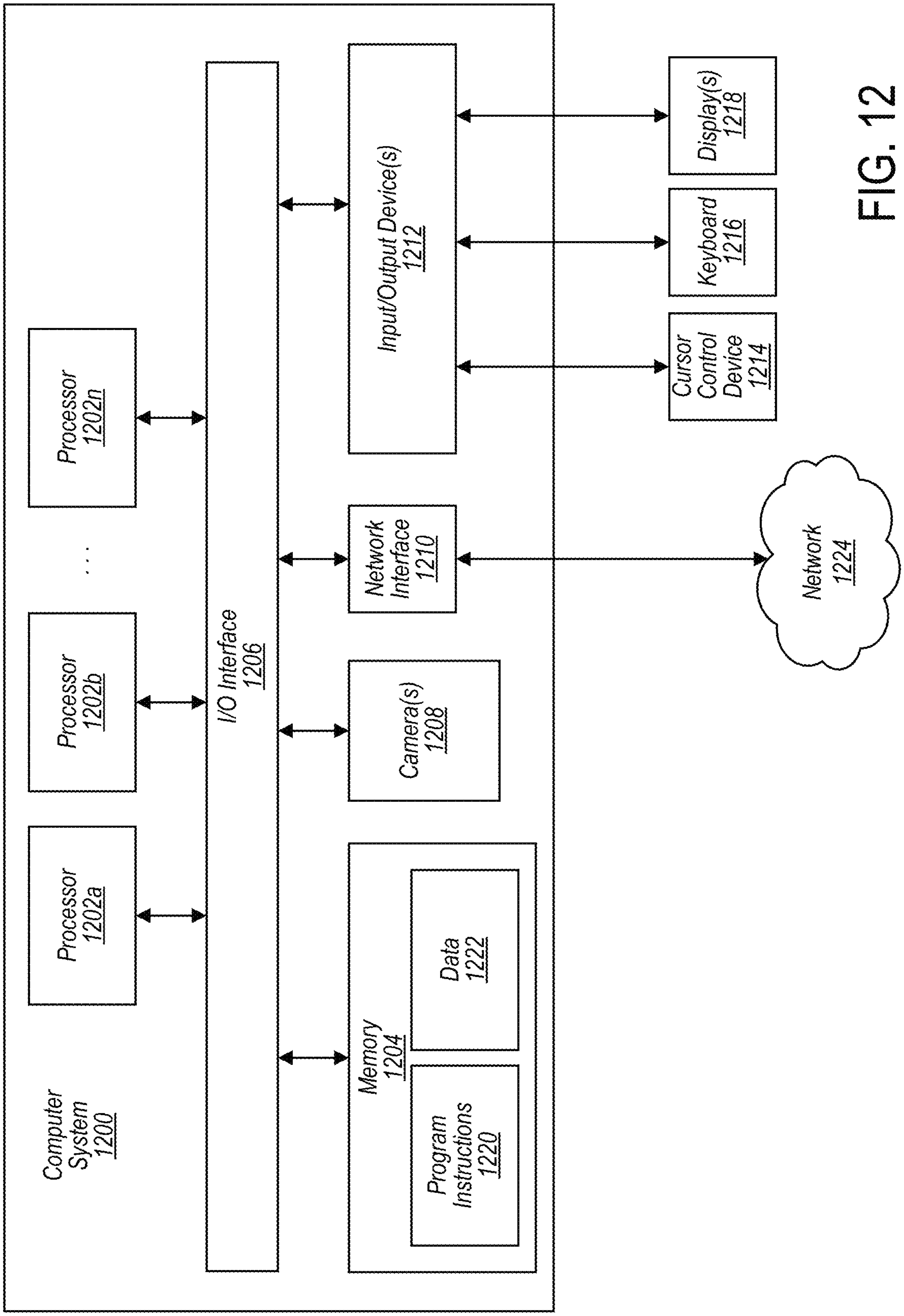
FIG. 12 illustrates a schematic block diagram of an example computing device, referred to as computer system, that may include or host embodiments of a camera, in accordance with some embodiments.

FIG. 12 illustrates a schematic block diagram of an example computing device, referred to as computer system 1200, that may include or host embodiments of a camera (e.g., as described herein with respect to FIG. 1). In addition, computer system 1200 may implement methods for controlling operations of the camera and/or for performing image processing images captured with the camera. In some embodiments, the device 1100 (described herein with reference to FIG. 12) may additionally, or alternatively, include some or all of the functional components of the computer system 1200 described herein.

The computer system 1200 may be configured to execute any or all of the embodiments described above. In different embodiments, computer system 1200 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 1200 includes one or more processors 1202 coupled to a system memory 1204 via an input/output (I/O) interface 1206. Computer system 1200 further includes one or more cameras 1208 coupled to the I/O interface 1206. Computer system 1200 further includes a network interface 1210 coupled to I/O interface 1206, and one or more input/output devices 1212, such as cursor control device 1214, keyboard 1216, and display(s) 1218. In some cases, it is contemplated that embodiments may be implemented using a single instance of computer system 1200, while in other embodiments multiple such systems, or multiple nodes making up computer system 1200, may be configured to host different portions or instances of embodiments. For example, in one embodiment some elements may be implemented via one or more nodes of computer system 1200 that are distinct from those nodes implementing other elements.

In various embodiments, computer system 1200 may be a uniprocessor system including one processor 1202, or a multiprocessor system including several processors 1202 (e.g., two, four, eight, or another suitable number). Processors 1202 may be any suitable processor capable of executing instructions. For example, in various embodiments processors 1202 may be general-purpose or embedded processors implementing any of a variety of instruction set architectures (ISAs), such as the x86, PowerPC, SPARC, or MIPS ISAs, or any other suitable ISA. In multiprocessor systems, each of processors 1202 may commonly, but not necessarily, implement the same ISA.

System memory 1204 may be configured to store program instructions 1220 accessible by processor 1202. In various embodiments, system memory 1204 may be implemented using any suitable memory technology, such as static random access memory (SRAM), synchronous dynamic RAM (SDRAM), nonvolatile/Flash-type memory, or any other type of memory. Additionally, existing camera control data 1222 of memory 1204 may include any of the information or data structures described above. In some embodiments, program instructions 1220 and/or data 1222 may be received, sent or stored upon different types of computer-accessible media or on similar media separate from system memory 1204 or computer system 1200. In various embodiments, some or all of the functionality described herein may be implemented via such a computer system 1200.

In one embodiment, I/O interface 1206 may be configured to coordinate I/O traffic between processor 1202, system memory 1204, and any peripheral devices in the device, including network interface 1210 or other peripheral interfaces, such as input/output devices 1212. In some embodiments, I/O interface 1206 may perform any necessary protocol, timing or other data transformations to convert data signals from one component (e.g., system memory 1204) into a format suitable for use by another component (e.g., processor 1202). In some embodiments, I/O interface 1206 may include support for devices attached through various types of peripheral buses, such as a variant of the Peripheral Component Interconnect (PCI) bus standard or the Universal Serial Bus (USB) standard, for example. In some embodiments, the function of I/O interface 1206 may be split into two or more separate components, such as a north bridge and a south bridge, for example. Also, in some embodiments some or all of the functionality of I/O interface 1206, such as an interface to system memory 1204, may be incorporated directly into processor 1202.

Network interface 1210 may be configured to allow data to be exchanged between computer system 1200 and other devices attached to a network 1224 (e.g., carrier or agent devices) or between nodes of computer system 1200. Network 1224 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1210 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1212 may, in some embodiments, include one or more display terminals, keyboards, keypads, touchpads, scanning devices, voice or optical recognition devices, or any other devices suitable for entering or accessing data by one or more computer systems 1200. Multiple input/output devices 1212 may be present in computer system 1200 or may be distributed on various nodes of computer system 1200. In some embodiments, similar input/output devices may be separate from computer system 1200 and may interact with one or more nodes of computer system 1200 through a wired or wireless connection, such as over network interface 1210.

Those skilled in the art will appreciate that computer system 1200 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1200 may be transmitted to computer system 1200 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . W, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112 (f) for that claim element. Should Applicant wish to invoke Section 112 (f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to one other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus, comprising:

at least one power supply;

a common plane electrically connected to the at least one power supply; and an image sensor, the image sensor including:

a plurality of pixels;

a plurality of connection points electrically connected to the pixels in the image sensor, wherein each of the connection points is coupled to the common plane via a corresponding pair of routings, the corresponding pairs of routings including a power signal routing and a ground signal routing; and a charge pump voltage regulator, wherein the charge pump voltage regulator is electrically connected to the at least one power supply via a power signal routing bypassing the common plane, and wherein a capacitor is coupled to the power signal routing at the common plane.

2. The apparatus of claim 1, wherein impedances of the power signal routings between the connection points and the common plane have an average percentage difference between the impedances of at most 10%, and wherein impedances of the ground signal routings between the connection points and the common plane have an average percentage difference between the impedances of at most 10%.

3. The apparatus of claim 2, wherein the common plane is electrically connected to the at least one power supply via at least one additional pair of a power signal routing and a ground signal routing, and wherein impedance of the power signal routing and impedance of the ground signal routing in the at least one additional pair are less than the impedances of the power signal routings and the ground signal routings between the connection points and the common plane.

4. The apparatus of claim 1, further comprising an organic substrate and a ceramic substrate, wherein the at least one power supply and the common plane are located on the organic substrate, and the image sensor is located on the ceramic substrate.

5. The apparatus of claim 4, wherein the organic substrate has an opening, such that the pixels on the ceramic substrate are exposed to light through the opening of the organic substrate.

6. The apparatus of claim 1, wherein the charge pump voltage regulator is electrically connected to a system ground via a ground signal routing bypassing the common plane, the system ground being isolated from ground connections on the common plane for the pixels.

7. The apparatus of claim 1, wherein the image sensor includes a plurality of analog to digital converters (ADCs), and wherein each of the ADCs is electrically connected to the common plane via a corresponding pair of ADC routings, the corresponding pairs of ADC routings including an ADC power signal routing and an ADC ground signal routing.

8. The apparatus of claim 1, wherein the connection points include at least four connection points shared by the pixels in the image sensor.

9. A camera assembly, comprising:

one or more lenses to propagate light through the camera assembly;

at least one power supply;

a common plane electrically connected to the at least one power supply; and an image sensor configured to receive light propagating through the one or more lenses, the image sensor including:

a plurality of pixels;

a plurality of connection points electrically connected to the pixels in the image sensor, wherein each of the connection points is coupled to the common plane via a corresponding pair of routings, the corresponding pairs of routings including a power signal routing and a ground signal routing;

a plurality of analog to digital converters (ADCs), wherein each of the ADCs is electrically connected to the common plane via a corresponding pair of ADC routings, the corresponding pairs of ADC routings including ADC power signal routings and ADC ground signal routings; and at least one ADC noise sensing circuit, wherein the at least one ADC noise sensing circuit is electrically connected to the common plane via an additional pair of routings, the additional pair of routings including an additional power signal routing and an additional ground signal routing, and wherein the additional ground signal routing is electrically connected to at least one of the ADC ground signal routings in the common plane.

10. The camera assembly of claim 9, wherein impedances of the ADC power signal routings between the connection points and the common plane have an average percentage difference between the impedances of at most 10%, and wherein impedances of the ADC ground signal routings between the connection points and the common plane have an average percentage difference between the impedances of at most 10%.

11. The camera assembly of claim 9, further comprising an organic substrate and a ceramic substrate, wherein the at least one power supply and the common plane are located on the organic substrate, and the image sensor is located on the ceramic substrate.

12. The camera assembly of claim 11, wherein the organic substrate has an opening, such that the pixels on the ceramic substrate are exposed to light through the opening of the organic substrate, the light being focused towards the pixels by the one or more lenses.

13. The camera assembly of claim 9, wherein the image sensor includes a charge pump voltage regulator, and wherein the charge pump voltage regulator is electrically connected to the at least one power supply via a power signal routing passing through the common plane, and wherein a capacitor is coupled to the power signal routing at the common plane.

14. The camera assembly of claim 13, wherein the charge pump voltage regulator is electrically connected to a system ground via a ground signal routing passing through the common plane, the system ground being isolated from a ground for the pixels.

15. A method, comprising:

providing, from at least one power supply, an output voltage and a ground for an image sensor to a common plane associated with the image sensor;

providing the output voltage from the common plane to a plurality of pixels located on the image sensor, wherein the output voltage is provided from the common plane to a plurality of connection points on the image sensor via individual power signal routings connected between the common plane and each of the connection points, wherein impedances of the power signal routings between the connection points and the common plane have an average percentage difference between the impedances of at most 10%; and providing the ground from the common plane to the plurality of pixels located on the image sensor, wherein the ground is provided from the common plane to the plurality of connection points on the image sensor via individual ground signal routings connected between the common plane and each of the connection points, wherein impedances of the ground signal routings between the connection points and the common plane have an average percentage difference between the impedances of at most 10%.

16. The method of claim 15, further comprising:

providing, from at least one additional power supply, an additional output voltage and an additional ground for the image sensor to the common plane associated with the image sensor;

providing the additional output voltage from the common plane to a plurality of analog to digital converters (ADCs) located on the image sensor, wherein the additional output voltage is provided from the common plane to each of the ADCs on the image sensor via individual ADC power signal routings connected between the common plane and each of the ADCs; and providing the additional ground from common plane to the plurality of ADCs located on the image sensor, wherein the additional ground is provided from the common plane to each of the ADCs on the image sensor via individual ADC ground signal routings connected between the common plane and each of the ADCs.

* * * * *